Patented Aug. 22, 1950

2,519,469

UNITED STATES PATENT OFFICE 2,519,469

DERIVATIVES OF VITAMIN B6 AND PROCESS OF PREPARING SAME

Dorothea Heyl, Rahway, Stanton A. Harris, Westfield, and Karl Folkers, Plainfield, N. J., assignors to Merck & Co., Inc., Rahway, N. J., a corporation of New Jersey No Drawing. Original application July 14, 1944, Serial No. 545,005. Divided and this application September 23, 1948, Serial No. 50,882

9 Claims. (Cl. 260—297)

This application relates generally to a process for the preparation of chemical compounds; in a particular sense it is concerned with the preparation of compounds having physiological activity similar to that of vitamin B6 (2-methyl-3-hydroxy-4,5-bis(hydroxymethyl) pyridine).

This application is a division of our copending application Serial No. 545,005, filed July 14, 1944, now abandoned.

It is known that nutritional factors of uncertain chemical composition, closely related in physiological activity to vitamin B6, possess greater growth-promoting activity for certain organisms than does vitamin B6 itself.

It is found that the chemical compound, 2-methyl-3-hydroxy-4-formyl-5-hydroxymethylpyridine, like the above mentioned nutritional factors, has several hundred fold greater growth promoting activity for S. lactis R than does vitamin B6.

According to one embodiment of this invention, it is found that 2-methyl-3-hydroxy-4,5-bis(hydroxymethyl)-pyridine (I) can be oxidized to 2-methyl-3-hydroxy-4-formyl-5-hydroxymethylpyridine, (II) and that this last mentioned compound can be isolated from the oxidation reaction mixture by formation of the oxime of this compound (III). Further in accordance with this invention, the oxime is reacted with nitrous acid and treated with alcohol to form the cyclic acetal (IV), this acetal on hydrolysis yields an equilibrium mixture of 2-methyl-3-hydroxy-4-formyl-5-hydroxymethylpyridine (II), and the hemi-acetal form of this compound (V). These reactions may be illustrated as follows:

compound (II) can be effected by the use of common oxidizing agents, for example, permanganates, chromates and dichromates.

The cyclic acetal, 1,3-dihydroxy-1-alkoxy-6-methylfuro-(3,4-c)-pyridine-7-ol (IV) is obtained preferably by treating the reaction product of nitrous acid and the oxime (III) with a lower aliphatic alcohol such as methanol, ethanol, and isopropanol. Hydrolysis of the cyclic acetal, for example with dilute acids, yields an equilibrium mixture of the hemi-acetal and 2-methyl-3-hydroxy-4-formyl-5-hydroxymethylpyridine.

The following example illustrates a method of carrying out the present invention, but it is to be understood that this example is given by way of illustration and not of limitation.

*Example*

(A) Formation of the oxime (III)

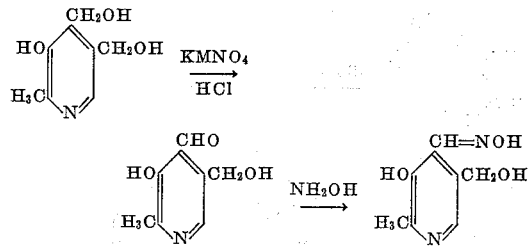

To about 9.6 g. of 2-methyl-3-hydroxy-4,5-dihydroxymethylpyridine hydrochloride in 200 cc. of water, neutralized with about 3.9 g. of sodium bicarbonate, is added 2 g. of potassium permanganate in 150 cc. of water in about one hour with

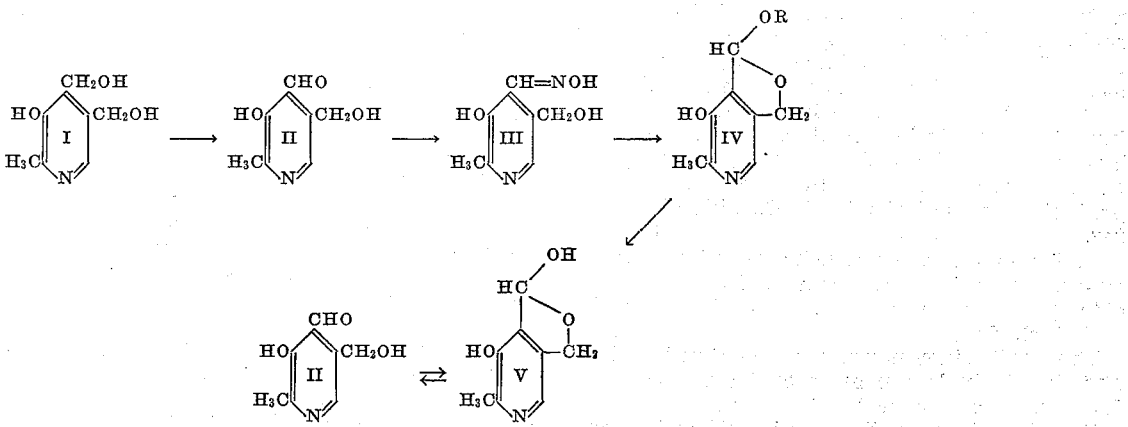

According to the present invention, it is found that the oxidation of vitamin B6 (I) to the formyl agitation. The resultant mixture is acidified to about pH 3, concentrated to about 100 cc., treated with 20 g. of sodium acetate and 9.7 g. of hydroxylamine hydrochloride, and cooled. The oxime of 2-methyl-3-hydroxy-4-formyl-5-hydroxy-methyl-pyridine (M. P. 221–223° C.) appears as a precipitate.

(B) Formation of the cyclic acetal (IV)

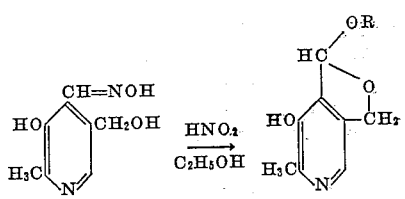

About 0.45 g. of sodium nitrite in 2 cc. of water is added with agitation to 1.12 g. of the oxime in 5 cc. of hydrochloric acid (6N) and 13 cc. of water, and heated to remove the free nitrous acid. The resulting mixture is concentrated under reduced pressure, and the residue therefrom allowed to stand with 15 cc. of absolute ethanol for about 16 hours, after which the mixture is filtered, concentrated, and crude 1,3-dihydro-1-ethoxy-6-methyl-furo-(3,4-c)-pyridine - 7 - ol hydrochloride (M. P. 141–143° C.) is precipitated by addition of ether to the solution. This crude product is removed and purified by conventional operations.

In like manner other lower aliphatic alcohols, such as, methanol or isopropanol, can be used in place of ethanol to obtain acetals having 1-methoxy or 1-isopropoxy substituents.

(C) Formation of the hemi-acetal (V)-aldehyde II equilibrium mixture

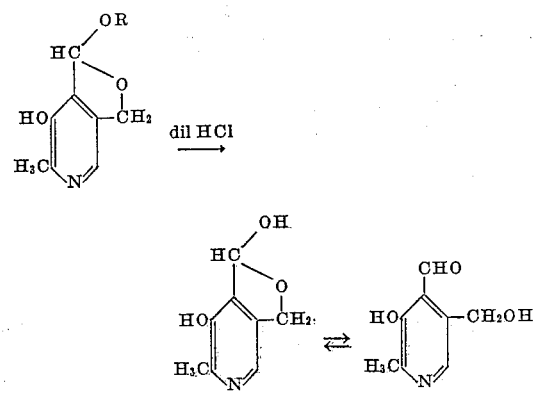

About 144 mg. of the cyclic acetal in 5 cc. of water containing a small amount of hydrochloric acid (6N), is heated to a temperature of the order of 50–55° C. for about 5 minutes, allowed to stand at room temperature for about 30 minutes, concentrated to dryness, to yield a residue consisting of an equilibrium mixture of 2-methyl-3-hydroxy-4-formyl-5-hydroxymethylpyridine and the hemi-acetal form of this compound. This product darkens at about 150° C., without melting.

In like manner acetals having 1-methoxy or 1-iso-propoxy substituents can be hydrolyzed to obtain the equilibrium mixture of hemi-acetal and aldehyde.

The equilibrium mixture of the hemi-acetal and the aldehyde can be reacted with acids to form corresponding acid salts. For example, reacting the mixture with sulfuric acid yields the sulfate salt, with a hydrohalide yields the hydrohalide salt.

Modifications may be made in carrying out the present invention without departing from the spirit and scope thereof and the invention is to be limited only by the appended claims.

We claim:

1. A compound of the formula:

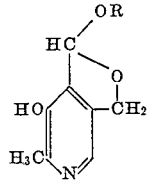

wherein R is a lower alkyl group, and acid salts thereof.

2. A compound of the formula:

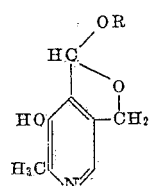

wherein R is a lower alkyl group, and hydrohalide salts thereof.

3. A compound of the formula:

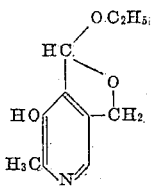

and acid salts thereof.

4. A compound of the formula:

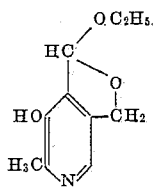

and hydrohalide salts thereof.

5. The process that comprises reacting 2-methyl-3-hydroxy-4-oximinomethyl-5-hydroxymethylpyridine with nitrous acid, treating the reaction product thus formed with a lower aliphatic alcohol, recovering the 1,3-dihydro-1-alkoxy-6-methyl-furo-(3,4-c)-pyridine-7-ol thus formed, hydrolyzing the latter compound and recovering an equilibrium mixture of 1,3-dihydro-1-hydroxy-6-methyl-furo-(3,4-c)-pyridine-7-ol and 2-methyl-3-hydroxy-4-formyl-5-hydroxymethylpyridine.

6. The process that comprises reacting 2-methyl-3-hydroxy-4-oximinomethyl-5-hydroxymethylpyridine with nitrous acid, treating the reaction product thus formed with a lower aliphatic alcohol and recovering the 1,3-dihydro-1-alkoxy-6-methyl-furo-(3,4-c)-pyridine-7-ol thus formed.

7. The process that comprises reacting 2-methyl-3-hydroxy-4-oximinomethyl-5-hydroxymethylpyridine with nitrous acid, treating the reaction product thus formed with ethyl alcohol and recovering the 1,3-dihydro-1-ethoxy-6-methyl-furo-(3,4-c)-pyridine-7-ol thus formed.

8. The process that comprises hydrolyzing 1,3-dihydro - 1 - alkoxy-6-methyl-furo-(3,4-c)-pyridine-7-ol and recovering an equilibrium mixture of 1,3-dihydro-1-hydroxy-6-methyl-furo-(3,4-c)-pyridine-7-ol and 2-methyl-3-hydroxy-4-formyl-5-hydroxymethylpyridine.

9. The process that comprises hydrolyzing 1,3-dihydro - 1 - ethoxy-6-methyl-furo-(3,4-c)-pyridine-7-ol with hydrochloric acid and recovering an equilibrium mixture of 1,3-dihydro-1-hydroxy-6-methyl - furo-(3,4-c)-pyridine-7-ol and 2-methyl-3-hydroxy-4-formyl-5-hydroxymethylpyridine.

DOROTHEA HEYL.
STANTON A. HARRIS.
KARL FOLKERS.

No references cited.